Dec. 25, 1962 R. BERGSMA 3,070,685
TEMPERATURE CONTROLLER
Filed May 16, 1960 2 Sheets-Sheet 1
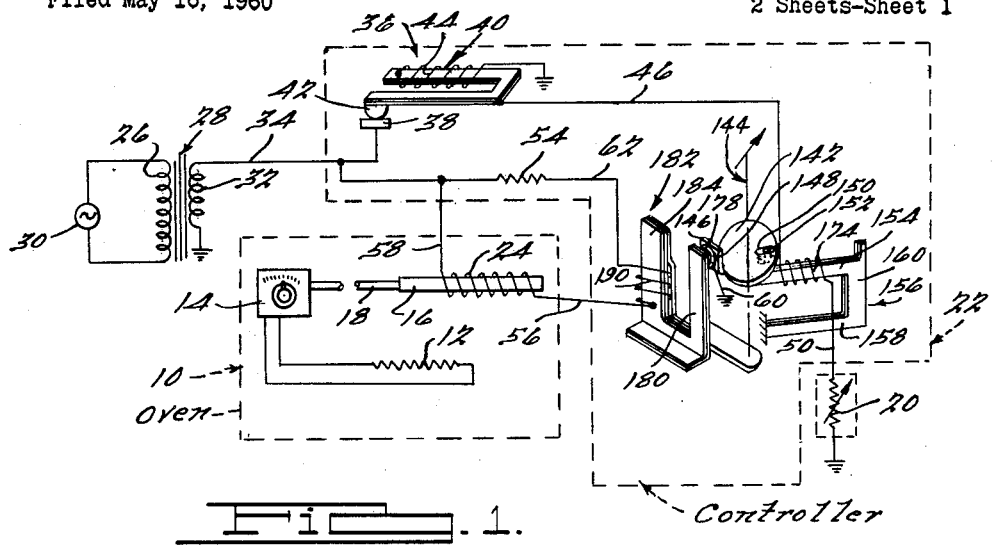
Fig. 1.
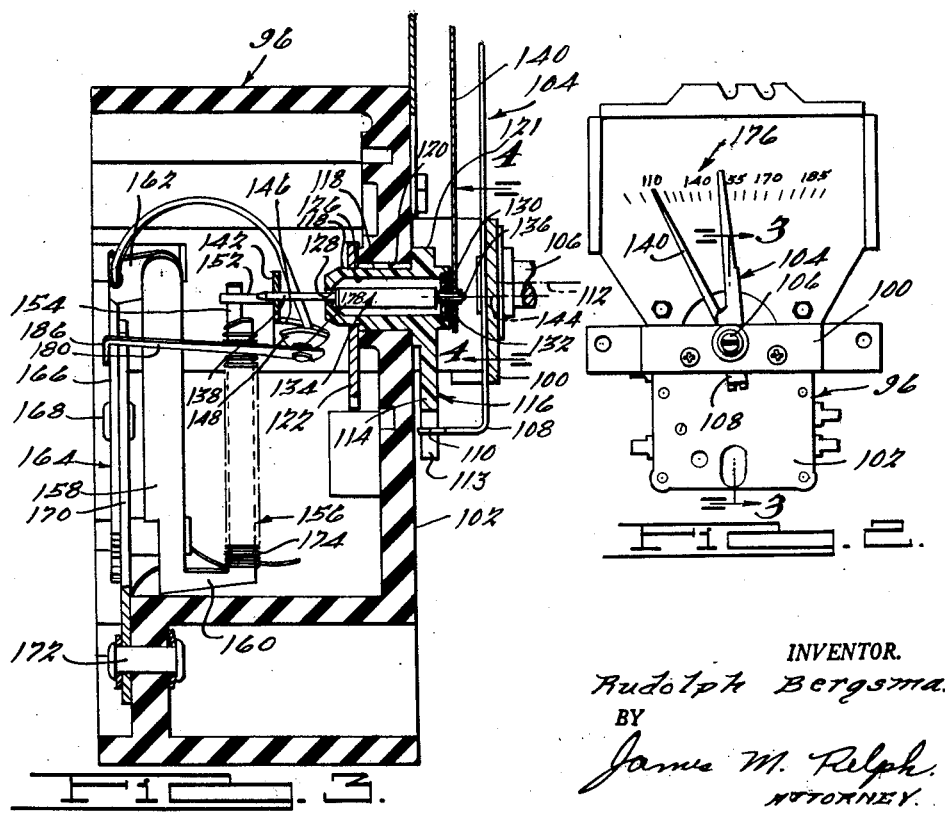
Fig. 2.
Fig. 3.
INVENTOR.
Rudolph Bergsma.
BY
James M. Ralph.
ATTORNEY.

Dec. 25, 1962   R. BERGSMA   3,070,685
TEMPERATURE CONTROLLER
Filed May 16, 1960   2 Sheets-Sheet 2
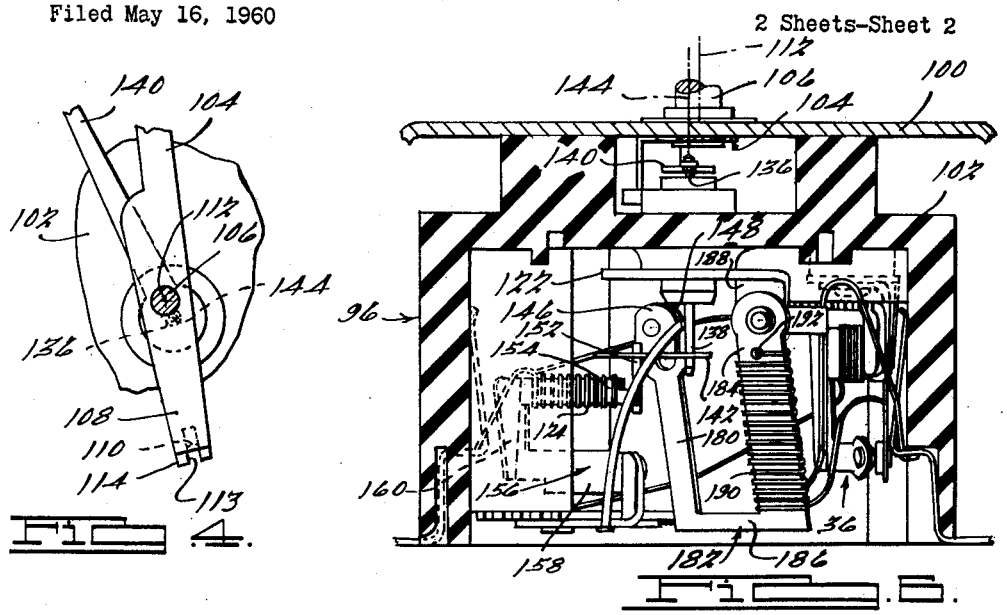
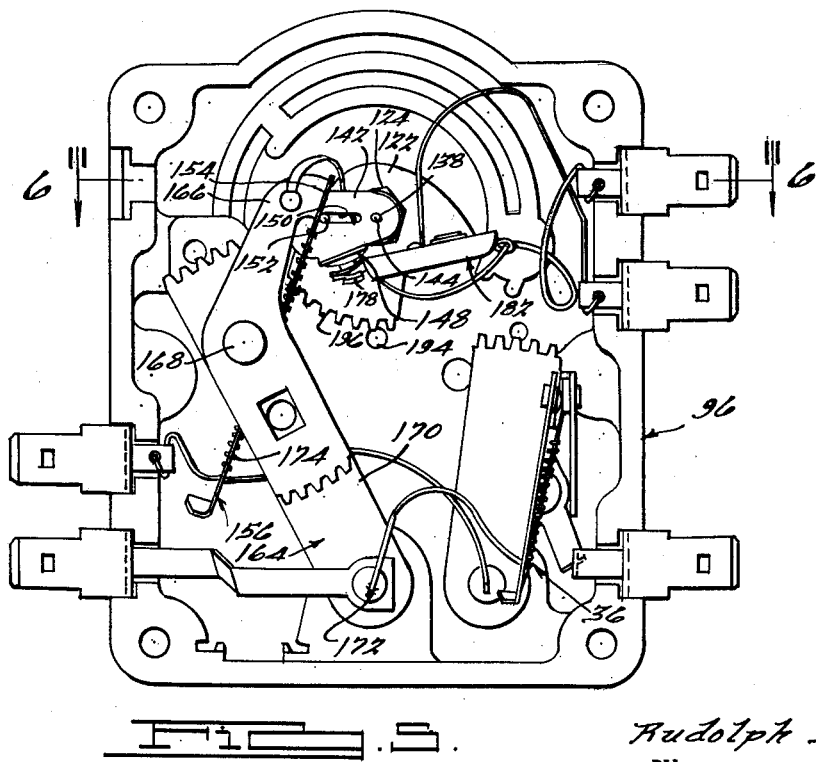
INVENTOR.
Rudolph Bergsma
BY
James M. Relph
ATTORNEY.

United States Patent Office 3,070,685
Patented Dec. 25, 1962

3,070,685
TEMPERATURE CONTROLLER
Rudolph Bergsma, Ann Arbor, Mich., assignor to King-Seeley Thermos Co., a corporation of Michigan
Filed May 16, 1960, Ser. No. 29,473
6 Claims. (Cl. 219—20)

This invention relates to electric control and indicating devices.

While the principles of the present invention may be advantageously utilized in other arrangements those principles are representatively embodied in a system for controlling the roasting or baking of meats, such as roasts, fowl and the like, and in that sense, is an improvement upon the arrangements disclosed in my co-pending United States application entitled "Temperature Responsive System," Serial No. 717,966, filed February 27, 1958, the disclosure of which is incorporated herein by reference.

In controllers of the type to which the principles of the present invention have representatively been applied, the meat is placed in an oven which is heated to a pre-selected relatively high temperature by means of an oven heater the energization of which is controlled by an oven temperature regulating system including means for sensing the temperature of the oven. Additional sensing means, usually in the form of an elongated probe insertable in the meat, serves to sense the internal temperature of the meat, and control means are provided responsive to the sensed internal temperature of the meat to control the operation of the oven temperature regulator. As is well known, the maximum internal temperature of the meat determines the degree of doneness of the meat, and accordingly the control means includes a settable pointer co-operating with a calibrated scale which may be set to indicate the desired final temperature of the meat, herein called the completion temperature. The control means or controller is further provided with an indicating pointer which is deflected in accordance with the sensed internal temperature of the meat to provide a continuing visual display of that internal temperature.

In the preferred practice, the oven is maintained at the aforesaid pre-selected relatively high temperature under the control of the oven temperature regulator until the interior of the meat has reached a temperature lower than but bearing a pre-selected relationship to the selected completion temperature. At that time, the controller, operating through the oven temperature regulator, commences to reduce the oven temperature. The difference between the internal temperature of the meat at which the reduction of the oven temperature is initiated and the selected completion temperature of the meat is termed the "anticipation." As the internal temperature of the meat continues to rise, the oven temperature is correspondingly reduced in a manner to cause the oven temperature and the internal temperature of the meat to reach equality at the selected completion temperature.

The present invention, as applied to systems of that nature, pertains to improved means for correlating the internal temperature of the meat and the final oven temperature with the several selectable completion temperatures, to improved means for achieving variable and correct anticipation, and to improved means for achieving coincidence between the settable and indicating pointers at each completion temperature over the entire range of those selectable completion temperatures.

The objects, features, and advantages of the present invention will become apparent from the following description of a preferred embodiment of the invention taken in conjunction with the accompanying drawings, in which:

FIGURE 1 is a schematic representation of a system to which the principles of the present invention are applied;

FIGURE 2 is a pictorial representation of a preferred form of controller for use in the system of FIG. 1;

FIGURE 3 is a sectional view taken substantially along the line 3—3 in FIG. 2;

FIGURE 4 is a sectional view taken substantially along the line 4—4 in FIG. 3;

FIGURE 5 is a rear view of the controller of FIG. 2; and

FIGURE 6 is a sectional view taken substantially along the line 6—6 of FIG. 5.

The control system depicted in FIGURE 1 of the drawings is adapted for use in association with a cooking oven 10 including an electrical resistance-type heater 12 energized from a suitable source of electrical energy under the control of a settable oven-temperature regulator 14 which is, in turn, controlled by an oven senser 16 disposed within the oven 10. While any suitable type of oven regulator and senser may be employed, it is herein assumed that a hydraulic-type sensing arrangement is utilized wherein the senser 16 contains an expansible liquid and is connected to the regulator 14 by means of a fluid conduit 18. The roast or other meat which is to be cooked is placed within the oven 10 and a meat temperature senser 20 is disposed in heat transfer relation with the interior of that article. The senser 20, represented symbolically as a variable resistance, normally takes the form of a slender elongated tubular member with a pointed or conoidal tip which may be forced into the meat or fowl so that the tip is disposed near the center thereof. The tip carries a temperature-responsive resistance which, in a common form, is a thermistor having a high negative temperature coefficient of resistance.

The controller 22 is responsive to the meat temperature senser 20 and controls the current through a heating means 24 disposed in heat transfer relation with the oven temperature senser 16. This heating means may, for example, take the form of a coil of resistance heating wire wound around the oven senser. Controller 22 is manually settable to any of a plurality of desired final or completion temperatures of the meat, and initiates the application of electrical energy to the heating means 24 at a preselected internal temperature of the meat, determined by the set or selected completion temperature. As the temperature of the meat continues to rise, the controller 22 modulatingly and correspondingly increases the energization of the heating means 24. When the internal temperature of the meat reaches the preselected completion temperature, the controller 22 supplies sufficient electrical energy to the heating means 24 to raise the temperature of the oven senser 16 an amount equal to the difference between the initial oven temperature, as selected by the regulator 14, and the selected completion temperature of the meat. In this fashion, the controller 22 causes the meat temperature and the oven temperature to reach equality at the pre-selected value.

In the schematic representation of FIGURE 1, the primary winding 26 of step-down transformer 28 is energized from a suitable source of alternating current 30. The reduced voltage induced across the secondary winding 32 of that transformer and appearing between conductor 34 and ground is applied to voltage regulator 36. Voltage regulator 36 may be, and preferably is, of the type disclosed in United States Patent No. 2,835,885 granted May 20, 1958, to Leonard Boddy, the disclosure of which is incorporated herein by reference. In general, the voltage regulator 36 comprises a fixed contact 38 to which conductor 34 is connected, a U-shaped ambient temperature-compensated polymetallic element 40 fixed at one end and carrying at its other end a contact 42 mateable with contact 38. The polymetallic element 40 is mounted so that it biases contact 42 into engagement with contact 38 and is arranged so that the application of heat to the anchored or back leg will deflect contact 42 away from contact 38. The heater winding 44 is connected between ground and the polymetallic element 40, which is otherwise insulated from ground. Therefore, the energizing circuit for the heater winding 44 includes the contacts 38 and 42 so that the voltage regulator 36 serves as a self-interrupting device, developing between the polymetallic element and ground a pulsating voltage having an average value which remains constant despite relatively substantial variations of the voltage of source 30.

The voltage appearing between the polymetallic element 40 and ground is applied across a circuit including conductor 46, resistance-type heater winding 174, conductor 50, and temperature senser 20. The heater 174 is disposed in heat transfer relation with leg portion 154 of a U-shaped ambient temperature compensated polymetallic element 156 which serves the function of a responder in that it responds to the variations of the resistance of the meat temperature senser 20. The two leg portions 154 and 158 of the responder element 156 are inter-joined by a rigidifying cross-piece 160. One end of leg portion 158 is effectively fixed and the free end of the other leg portion 154 carries a driving pin 152. The pin 152 slidably engages a slot 150 in a member 142 which is rotatable about an axis 144. The changes of current through the heating means 174 in response to changes of the resistance of senser 20 change the temperature of polymetallic leg portion 154. The resulting change in the deflection of the leg portion 154 rotates member 142 about axis 144, an increase in the sensed temperature producing corresponding counterclockwise rotation of the member 142 in the illustrated arrangement. The angular rotation of the member 142 is desirably a substantially linear function of the change of sensed temperature so that an indicating pointer rotating with the member 142 may be used in association with a linear temperature scale.

The rotatable member 142 carries an electrical contact 148 which is mateable with an electrical contact 178 supported upon the free end of leg portion 180 of another generally U-shaped ambient temperature compensated polymetallic element 182. The remote end of the other leg portion 184 of the element 182 is mounted for manual rotation about the axis 144 in a manner to be described hereinafter. The selection of the rotational position of member 182 and hence of the rotational position of the contact 178 determines the internal temperature of the meat at which the oven senser heating means 24 will first be energized and determines the magnitude of the energization of that heating means at the completion temperature.

Heating means 190, representatively in the form of an electrical resistance-type heater, is disposed in heat transfer relation with the back leg portion 184 of the polymetallic element 182. One end of the heater winding 190 is electrically secured to the polymetallic element 182 and the other end is connected to the source of potential at conductor 34 through a resistor 54. The heating means 24 for the oven senser 16 is connected to the polymetallic element 182 by means of a conductor 56 and is connected to the source of potential on conductor 34 by means of a conductor 58.

Since electrical contact 178 is connected via conductor 60 to ground, engagement of the electrical contacts 178 and 148 will complete a circuit from the voltage appearing at conductor 34, resistor 54, conductor 62, heating means 190, through the polymetallic element 182, and through the contacts 178 and 148 to ground, and will also complete a circuit from the potential on conductor 34, through the heating means 24, conductor 56, and through the contacts 178 and 148 to ground. The resultant current produces heating of both the oven senser 16 and of the polymetallic leg portion 184. The resulting deflection of leg portion 184 moves the contact 178 away from and out of engagement with contact 148 to interrupt both of the traced heating circuits. The resultant cooling of the leg portion 184 permits contact 178 to deflect back into engagement with the contact 148 to re-establish the heating circuits. By virtue of this self-interrupting action, contact 178 will, following its first engagement with contact 148, maintain an incipient opening and closing relationship with the contact 148 so that contact 178 will follow the changes of position of contact 148. As contact 148 is advanced toward contact 178, increasing amounts of heat energy must be applied to polymetallic leg portion 184 to maintain the contacts in their incipient relationship against the increasing counter-bias of the polymetallic material, so that the duration of each closure interval will increase as the sensed temperature increases. The average voltage across the heating means 190 will correspondingly increase as will the average voltage across the heating means 24. In this fashion, the energization of the heating means 24 is varied as a preselected function of the position of the responder contact 148 and, hence, as a predetermined function of the internal meat temperature, for any preselected initial setting of contact 178. The relationship will, of course, change with changes in the set completion temperature.

It may be noted that the device including polymetallic element 182, heater 190 and contacts 178 and 148 serves as an electro-mechanical transducer to deliver an output voltage having an average value which varies (for any given initial setting) in accordance with the physical position of contact 148 and that the output voltage of that device will not vary in average magnitude with variations of the magnitude of the voltage from source 30, for the reasons that device 36 operates effectively as a voltage regulator.

A preferred construction of controller 22 is illustrated in FIGURES 2 through 6 of the drawings. As may there be seen, the components are disposed in a hollow casing or housing 96 of insulating material. A bracket or bridge 100, attached to the external face 102 of the housing 96, rotatably supports a shaft 106 to which a setting pointer 104 is secured. The downwardly projecting portion 108 of the pointer 104 is provided with an offset portion 110 and serves as a lever arm rotatable with the shaft 106 and about the axis 112 of that shaft. The portion 110 of the pointer 104 engages a slot 113 defined by the bifurcated end of a lever arm portion 114 of a bearing member 116. The bearing member 116, which is preferably formed of plastic such as nylon, has a cylindrical portion 118 rotatably supported in an aperture 120 in the housing 96. At its forward end the cylindrical portion 118 is provided with an enlarged diameter portion 121 which engages the face 102 of the housing 96 to prevent rearward movement of the cylindrical portion 118 relative to the housing 96. A bracket 122 having a hexagonal aperture 124 therein (FIG. 5) is press-fitted upon the section of the cylindrical portion 118 which projects within the cavity in the housing 96. Bracket 122 engages a portion of the inner face of that housing to prevent movement of the bearing 116 forwardly of the casing.

Bearing 116 is provided with an internal bore 126 (FIG. 3) tapering at one end to a small diameter aperture 128 and provided with an enlarged counterbore 130 at the other end. A washer 132, having a small diameter aperture centrally disposed therein, is secured within the counterbore 130. A staff 134 having forwardly and rearwardly projecting coaxial end portions 136 and 138, respectively, is disposed within the bore 126. The axially projecting portion 136 extends through the aperture in and is journaled by the washer 132 and carries an indicating pointer 140 which is fixed thereto. The inwardly extending coaxial end portion 138 of the staff 134 projects through the aperture 128 and is journaled thereby and carries at its remote end a contact-supporting member 142 secured thereto. The staff 138, the indicating pointer 140 and the contact-supporting member 142 rotate together about the axis 144 of the staff 134.

By virtue of the engagement between the inwardly projecting portion 110 of the lever arm portion 108 with the slot 113 in the lever arm portion 114 of the bearing member 116, rotation of the shaft 106 about its axis 112 will cause bearing 116 and bracket 122 to rotate about axis 144. During the course of this rotation, the portion 110 of the lever arm 108 will slide along the slot 113 due to the eccentricity between the axes.

The relation between the axes 112 and 144 may best be seen in FIGURE 4 of the drawings in which it will be observed that the axis 144 is parallel to, but in predetermined spaced relation with, the axis 112. The eccentricity of two axes is small but, as will be described hereinafter, produces a sought-after result. In a preferred construction, the eccentricity between the axes 112 and 144 was about 0.05 inch, and, with the selected scale calibration illustrated in FIGURE 2, the axis 144 was disposed below and slightly to the right of the axis 112 when viewed from the front of the instrument. It will be observed that the distance between axis 112 and the point of driving interconnection between the lever arm portion 110 and the slot 113 in the lever arm 114 is very large relative to the eccentricity, that is, the distance between the axes 112 and 144, and that the distance between the axis 144 and the point of engagement between elements 110 and 113 is also very large relative to the distance between the axes 112 and 144.

The contact supporting member 142 is provided with a perpendicular flange portion 146 to which an electrical contact 148 is secured. Contact supporting member 142 is further provided with a slot 150 (FIG. 5) in which a pin 152 is slidably disposed. Pin 152 is secured to the free end of leg portion 154 of a U-shaped polymetallic element 156. The other end of the leg portion 154 is connected to one end of a generally parallel leg portion 158 by means of a rigidified crosspiece 160. The remote end of leg portion 158 is welded or otherwise secured to a depending portion 162 of a calibrating bracket assembly 164 comprising a first bracket 166 carrying depending portion 162 and pivotally secured at 168 to a second bracket 170 which is pivotally secured to the housing 96 at 172. The heater winding 174 is wound around the polymetallic leg portion 154.

As previously noted, upon energization of the heater 174, the polymetallic leg portion 154 deflects to move the pin 152 to rotate the contact supporting member 142 about the axis 144, increasing energization of the heater winding 174 producing counterclockwise rotation of the contact support member 142 in the view of FIGURE 5 of the drawings and, accordingly, producing counterclockwise rotation of the contact 148 about the axis 144. The rotational positions of the contact supporting member 142, the contact 148, the staff 134 and the indicating pointer 140 bears a direct relation to the sensed temperature, and pointer 140 accordingly cooperates with a series of calibrations 176 (FIG. 2) on the face of the controller.

Contact 148 cooperates with electrical contact 178 (FIG. 5) which is supported at the free end of leg portion 180 (FIG. 6) of a polymetallic element 182. The other end of leg portion 180 is interjoined with one end of a generally parallel leg portion 184 by means of a rigidified cross-flange 186, and the other end of leg portion 184 is riveted or otherwise secured to a flange 188 integral with the bracket 122. The generally U-shaped ambient temperature-compensated polymetallic element 182 carries the heater winding 190 on the back or anchored leg portion 184 thereof, and one end of that heater winding is electrically secured to that leg portion at point 192.

Since bracket 122 is rotatable about axis 144 in response to the rotation of shaft 106 about axis 112, contact 178 is also rotated about axis 144. While bracket 122 frictionally engages the cylindrical portion 118 of bearing 116 and does not rotate thereon during use, those elements can be shifted in their rotational relationship during the calibration of the unit. This is accomplished by inserting the tip of a toothed key in a socket 194 (FIG. 5) in the housing 96 to bring the teeth on that key into relationship with a sector 196 formed on the bracket 122. Rotation of the key will produce rotation of the bracket 122 about the axis 144 and will produce relative rotation between the bracket 122 and the bearing 116 if the shaft 106 is held against rotation during the rotation of the key. In this manner, the proper initial relationship between the position of the contact 178 and the settable pointer 104 (FIGS. 2 and 3) may be established.

In the normal use of the apparatus, the settable pointer 104 is positioned by rotating shaft 106, so that it points to the selected completion temperature of the meat as indicated on the calibrated scale 176 (FIG. 2). At the beginning of the cooking operation, the interior of the meat is at a relatively low temperature so that contact 148 (FIG. 5) is at or close to its maximum clockwise rotational position anl substantially spaced from the contact 178. As the internal temperature of the meat rises, the polymetallic leg portion 154 of the responder element 156 deflects to rotate the contact 148 about the axis 144 towards the contact 178.

At some pre-selected internal temperature of the meat, contacts 148 and 178 make initial contact. The control apparatus is illustrated in that condition. Thus, contacts 148 and 178 are shown is engagement, settable pointer 104 is positioned to produce a completion temperature of approximately 150° F. (FIG. 2) and the indicating pointer 140 indicates an instant internal meat temperature of about 110° F.

As the internal temperature of the meat continues to rise toward 150° F., the contact 148 rotates about axis 144 and the action of polymetallic element 182 causes contact 178 to retreat to maintain the incipient opening and closing relationship between the contacts 148 and 178. It will be observed that there is little or no restraining force exterted by the assembly including contact 178 impeding the movement of contact 148. The internal temperature of the needle will continue to rise until equilibrium conditions are reached at which the contacts 148 and 178 no longer can jointly advance in a counter-clockwise direction, at which the oven temperature regulator is biased to the point at which the oven temperature is equal to the preselected completion temperature, and at which the internal temperature of the meat is also equal to that selected completion temperature.

If the axes 112 and 144 were coincident, the resultant structure would possess a number of defects in terms of achieving accurate equality between the oven and meat temperatures at all selected completion temperatures, in terms of achieving coincidence between the tips of the two pointers 104 anl 140 at all selected completion temperatures, and in terms of establishing a proper relationship between anticipation of set temperature over the range of set completion temperatures. With the disclosed eccentricity between the axis 112 and the axis 144, significant and substantial improvements in the operation of the system are achieved. With properly selected eccentricity, pointer coincidence will be achieved at each of the selected completion temperatures, and the differential temperature between each selected completion temperature and the internal temperature of the meat at which reduction of the oven temperature will be initiated (the anticipation) will be appropriate for each of the selected completion temperatures. Thus, in a constructed embodiment of the invention, as disclosed in the drawings, the anticipation is 40° F. when the completion temperature is selected to be and set at 145° F. and the anticipation is 20° F. when the completion temperature is selected to be and set at 185° F. With the settable pointer 104 aligned with the 145° F. mark on the scale, reduction of the oven temperature will therefore be initiated when the internal temperature of the meat reaches a value of 105° F.; and when the pointer 104 is aligned with the 185° F. marking on the calibrated scale 176, the reduction of the oven temperature will be initiated when the internal temperature of the meat reaches 165° F.

This variable anticipation, in degrees Fahrenheit, also, of course, connotes variable anticipation in angular degrees of movement from their point of initial contact to their equilibrium position. Intermediate these extremes, the curve of anticipation versus the setting of pointer 104 (that is, versus the completion temperature) is tailored to produce optimum results.

Mathematical analysis demonstrates that for any given constructional arrangement such as that disclosed, the curve of the angle of rotation of the pointer 104 (from a reference axis) versus the anticipation is sinuous (but not precisely sinusoidal) and passes through a maximum and a minimum as the pointer 104 is rotated through a full revolution (in a mathematical sense, it being recognized that a complete revolution of pointer 104 cannot be accomplished in the particular physical structure disclosed). Since the pointer 104 in the disclosed physical arrangement rotates only through an angle of approximately forty angular degrees, but a forty angular degree section of the above-noted 360° sinuous curve is utilized.

In the constructed arrangement, a portion of the curve was employed which was optimum for the circuit and mechanical parameters employed, with the distance between the two axes, as above noted, being 0.05 inch and with the axes 112 and 144 lying along the center line of the settable pointer when that settable pointer is indicating 140° F. on the calibrated scale 176. The portion of the sinuous curve which is utilized may be shifted by effectively rotating the axis 144 around the axis 112, while maintaining the preselected distance therebetween. In this fashion, the rate of change of anticipation with changes of the angle of the settable pointer can be selected to be a constant over the selected range of angular rotation of the settable pointer, or can be selected to increase or decrease during the course of that forty angular degree movement of the settable pointer. Furthermore, the output characteristics of the device may be tailored as desired by changing others of the parameters including the distance between the axes 112 and 144, the distance between those axes and the point of engagement between the lever arms 108 and 114, and other such parameters.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

I claim:
1. In a temperature control apparatus for controlling the temperature of an oven in accordance with the sensed temperature of a mass being heated in the oven, the combination of first electrical contact means, first pointer means, means for supporting said first pointer means for rotation about a first axis, means for continuously positioning said first contact means and said first pointer means in accordance with the sensed temperature of the mass, second electrical contact means mateable with said first electrical contact means, second pointer means, means for supporting said second pointer means for rotation about a second axis substantially parallel with but spaced a preselected distance from said first axis, manually rotatable means rotatable to any of a plurality of positions, means controlled by said manually rotatable means for rotating said second pointer means and for moving said second contact means to selected positions, and means including both of said electrical contact means and a polymetallic element controlling the position of said second electrical contact and heated under the control of said electrical contacts for producing an electrical output signal having a characteristic which varies in accordance with both the sensed temperature of the mass and the position of said manually rotatable means.

2. In a temperature control apparatus for controlling the temperature of an oven in accordance with the sensed temperature of a mass being heated in the oven, the combination of first electrical contact means, means supporting said first electrical contact means for rotation about a first axis, second electric contact means mateable with said first electrical contact means, supporting means for supporting said second electrical contact means for rotation about said first axis independently of the rotation of said first contact means, means for positioning said first contact means in accordance with the sensed temperature of the mass, settable pointer means, means for supporting said settable pointer means for rotation about a second axis substantially parallel with but spaced a preselected distance from said first axis, manually rotatable means rotatable to any of a plurality of positions, means controlled by said manually rotatable means for rotating said settable pointer means about said second axis and for rotating said second contact means about said first axis to selected positions, and means including both of said electrical contact means for producing an electrical output signal having a characteristic which varies in accordance with both the sensed temperature of the mass and the position of said manually rotatable means.

3. The combination of claim 2 further including indicating pointer means, and means for supporting said indicating pointer means for rotation about said first axis, and in which said means for positioning said first contact means further controls the position of said indicating pointer means.

4. The combination of claim 2 in which said means for rotating said pointer means and said first contact means comprises first lever arm means rotatable about said first axis, means interconnecting said first lever arm means and said supporting means for causing rotation of said first lever arm means to produce corresponding rotation of said second contact means, second lever arm means rotatable about said second axis, and means drivingly interconnecting said first and said second lever arm means.

5. The combination of claim 2 in which said means for rotating said pointer means and said first contact means comprises first lever arm means rotatable about said first axis, means interconnecting said first lever arm means and said supporting means for causing rotation of said first lever arm means to produce corresponding rotation of said second contact means, second lever arm means rotatable about said second axis, and means drivingly interconnecting said first and said second lever arm means at a point spaced from both of said axes a distance greater than said preselected distance.

6. In a temperature control apparatus including temperature sensing means, the combination of first lever arm means rotatable about a first axis, first and second electrical contacts, first electrical contact supporting means rotatable about a second axis substantially parallel with but spaced a preselected distance from said first axis for supporting said first electrical contact in spaced relation with and for rotation about said second axis, means controlled by the temperature sensing means for moving said second electrical contact in a direction towards said first electrical contact with increases in the sensed temperature, second lever arm means rotatable with said first electrical contact about said second axis, and means drivingly connecting said second lever arm means to said first lever arm means at a point on said first lever arm means spaced from said first axis a distance greater than said preselected distance.

References Cited in the file of this patent
UNITED STATES PATENTS

| | | |
|---|---|---|
| 2,846,531 | Baker | Aug. 5, 1958 |
| 2,910,569 | Boddy | Oct. 27, 1959 |
| 2,914,644 | Holtkamp | Nov. 24, 1959 |
| 2,963,566 | Ross et al. | Dec. 6, 1960 |